(12) United States Patent
Reis et al.

(10) Patent No.: US 8,808,635 B2
(45) Date of Patent: Aug. 19, 2014

(54) REACTOR AND METHOD FOR OBTAINING CARBON MATERIAL BY SHORT CIRCUIT ELECTRIC CURRENT

(75) Inventors: Marcos Allan Leite dos Reis, Belem (BR); Jordan Del Nero, Belem (BR)

(73) Assignee: Universidade Federal do Pará, Belém-PA (BR)

( * ) Notice: Subject to any disclaimer, the term of this patent is extended or adjusted under 35 U.S.C. 154(b) by 1338 days.

(21) Appl. No.: 12/520,416

(22) PCT Filed: Dec. 21, 2007

(86) PCT No.: PCT/BR2007/000355
§ 371 (c)(1),
(2), (4) Date: Sep. 30, 2009

(87) PCT Pub. No.: WO2008/074114
PCT Pub. Date: Jun. 26, 2008

(65) Prior Publication Data
US 2012/0325648 A1 Dec. 27, 2012

(30) Foreign Application Priority Data
Dec. 21, 2006 (BR) .................................. 0605797

(51) Int. Cl.
*B01J 19/08* (2006.01)
(52) U.S. Cl.
USPC .................................................... 422/186.21

(58) Field of Classification Search
USPC .................................................... 422/186.21
See application file for complete search history.

(56) References Cited

U.S. PATENT DOCUMENTS

| | | | | |
|---|---|---|---|---|
| 5,085,746 | A * | 2/1992 | Musselman et al. | 205/659 |
| 2004/0026232 | A1* | 2/2004 | Boxman et al. | 204/164 |
| 2004/0245088 | A1 | 12/2004 | Gardner | |
| 2006/0042927 | A1 | 3/2006 | Benavides | |

OTHER PUBLICATIONS

"Safe Handling of Hydrochloric Acid", Japan Soda Industry Association, Nov. 2006.*

* cited by examiner

*Primary Examiner* — Kishor Mayekar
(74) *Attorney, Agent, or Firm* — Sughrue Mion, PLLC

(57) ABSTRACT

A new and low cost method for producing single wall nanotubes and other allotropic forms of carbon. The method uses a high electric current and 127 VAC or 220 VAC power supplies to sublimation of a solid precursor, which material can be made of graphite. The solid precursor is connected to metallic electrodes, so that an intense electric current cross the contacts to pulverize the graphite under high temperature. The carbon materials are deposited in the wall of the reactor as well as in the electrodes, in an atmospheric pressure. The obtained material is purified in acids and, then, the carbon nanotubes are separated. In general, the synthesis is characterized by the absence of a metal catalyst, the employ of a short circuit current with an agent to produce carbon materials, the low pressure into reaction, and the assembly of the apparatus involving a low voltage of operation.

6 Claims, 2 Drawing Sheets

A

REACTOR AND METHOD FOR OBTAINING CARBON MATERIAL BY SHORT CIRCUIT ELECTRIC CURRENT

FIELD OF THE INVENTION

The present invention refers to the productions of carbon materials, e.g. single wall nanotubes, by means of short circuit electric current.

BACKGROUND OF THE INVENTION

Since their discovery, carbon nanotubes have been object of several studies and researches, which revealed their specific physical, chemical, electrical and optical properties. Scientific and commercial interests are closely related to said carbon materials due to their properties.

Single wall carbon nanotubes (SWCNT) can be produced by a variety of methods, such as arc discharge, laser ablation, thermal carbon vapour deposition (CVD), plasma CVD, deposition of $CN_x$ films by electrolysis of organic liquids and a reaction with a catalyst carbon paper.

The arc discharge and laser ablation are methods in which a precursor material is constituted by a solid carbon-based material (a graphite rod), wherein it is sublimed at high temperatures (>3600K). The thermal CVD and plasma CVD are methods in which a precursor material is a gas phase (hydrocarbon). Document US 2006/7125525 (Schiavon) describes an apparatus and a method based in an environment wherein a graphite element is sublimed in plasma, under an inert gas that is carried through a high electromagnetic field.

Another thermal CVD method is disclosed in document US 2007/0003471 (Kawabata), wherein the growth of carbon nanotubes on a substrate occurs without increasing residual carbon impurities. This method is also described in document US 2006/0111334 (Klaus), but the nanotubes are formed on a substrate by using a catalytic CVD method.

Yan, X. et al. (Yan, X. et al. "Preparation and characterization of electrochemically deposited carbon nitride films on silicon substrate" J. Phys. D: Appl. Phys., 37(2004), p. 1-7) describes an electrochemical deposition of films in organic liquids, using a large area deposition, a low temperature (about 60° C.), a DC power supply voltage of 800V and a duration of 10 h. A catalyst carbon paper is used in document US 2003/0111334 (Dodelet), wherein nanoparticles are randomly deposited on a carbon substrate and heated.

The methods mentioned above produce a large amount of carbon amorphous and nanotubes, in an uncontrolled and disordered manner. Document US 2007/0140947 (Schneider) describes a method for continuously manufacturing organized carbon nanotubes. However, the method requires a porous substrate (non carbon elements, e.g. Si, N and P) and catalytic particles.

The application of these methods for manufacturing carbon nanotubes requires complex equipments, rigorous experimental conditions, including high vacuum environments and high temperatures. So that these materials produced with Therefore, the carbon materials obtained by these methods present a high cost and a low yield (very small amounts are produced), thus representing an obstacle to their utilization in industrial scale and scientific researches.

SUMMARY OF THE INVENTION

It is a purpose of the present invention to provide a new method for producing carbon materials, such as carbon nanotubes, by using a short circuit electric current.

The present invention refers to a method for producing carbon nanostructures, wherein an intense electric current is carried through a graphite rod, which is connected to two metallic electrodes The method of the invention does not use powders of transition metals (e.g. Fe, Co, Ni) acting as catalysts. Also, the reaction can be carried out in an ordinary atmosphere. Particularly, it is carried out in an inert atmosphere.

The new method of the present invention produces nanotubes without using substrates or thermal CVD, at a very low voltage (127 or 220 VAC) and a simple apparatus assemble.

BRIEF DESCRIPTION OF THE DRAWINGS

FIG. 1 (A) illustrates the production of nanotubes using an inert gas (e.g. nitrogen), at a low pressure. FIG. 1 (B) illustrates the apparatus, which is assembled without the glove box.

FIG. 4 (A) shows two characteristics bands of SWNTC, namely disorder (D) and graphite (G), which appear around 1350 $cm^{-1}$ and 1600 $cm^{-1}$, respectively. FIG. 4 (B) shows two peaks in the radial breathing mode: $RBM_1$ and $RBM_2$ are 219 $cm^{-1}$ and 284 $cm^{-1}$, respectively.

DETAILED DESCRIPTION OF THE INVENTION

The reactor of the present invention comprises a simple apparatus, which is used for producing carbon materials, such as nanotubes, according to the method of the present invention. Said apparatus is illustrated in FIG. 1, wherein FIG. 1 (A) uses an inert atmosphere and FIG. 1 (B) uses a room atmosphere.

Figure 1:
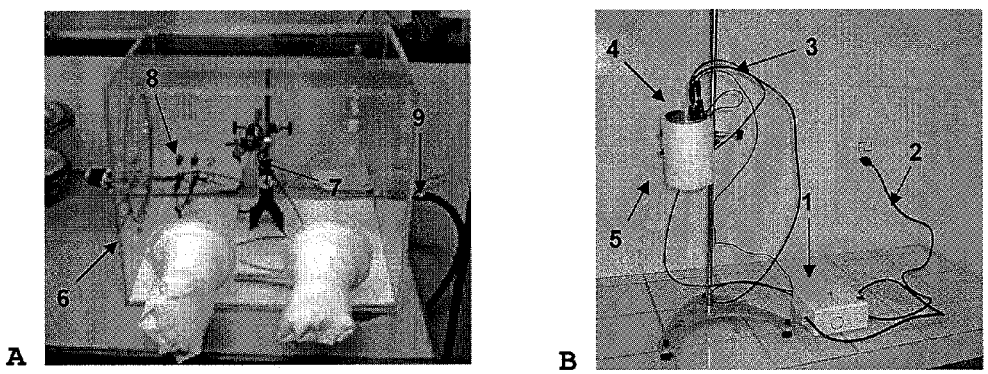
FIG. 1 shows a simple apparatus assembled into a glove box, at an ordinary atmosphere (room atmosphere).

FIG. 1 (A) shows a glove box (6), wherein is assembled a glass vessel with bracket (7) and electrodes (8) are plugged to an AC power supply. A tube (9) is connected to a glove box (6), being responsible for carrying an inert gas (e.g. nitrogen). On the other hand, the reactor and method of the present invention can produce the nanotubes without using a glove box (6). These method and reactor comprise five parts as shown in FIG. 1 (B). The first part is an electronic box (1), which comprises electronic circuits that are connected to an electric cable (2) plugged in an AC power supply. The second part is an electric cable (3), which is external from part 1 and is connected to a plug (4) of a glass reactor (5). The fourth and the fifth parts are assembled in a bracket.

Figure 2:
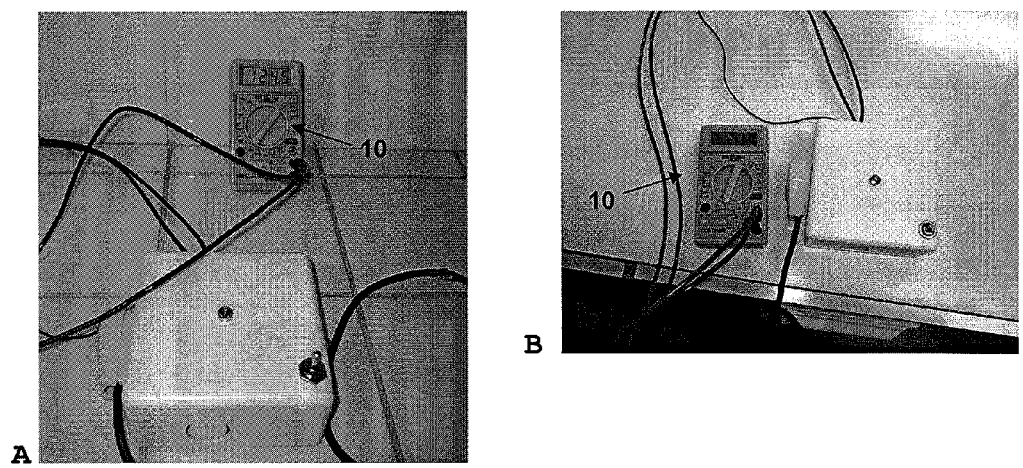
FIG. 2 shows two root-mean-square of voltage of AC power supply for operating the apparatus. The frequency is more than 60 Hz, wherein 124.5 VAC and 217.0 VAC are shown.
Figure 3:
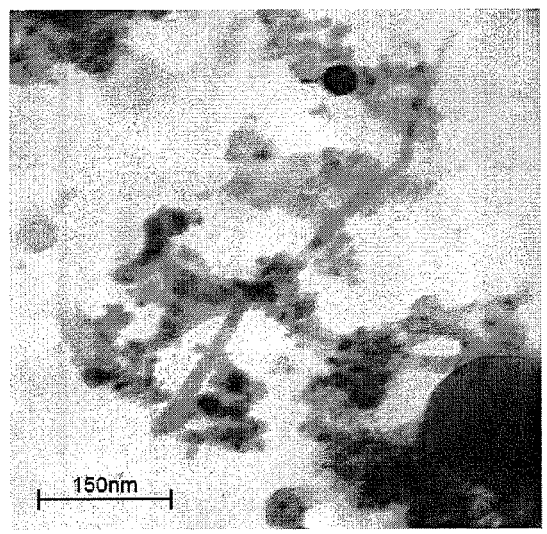
FIG. 3. shows an image from a Transmission Electron Microscope (TEM) of a SWCNT involved by carbon nanostructures, both produced by the method of the present invention.

FIG. 2 shows a multimeter (10) indicating the voltage on a graphite rod that is pulverized when is carried an intense electric current (short circuit electric current). Said method produces the nanotubes illustrated in accordance with the TEM image presented in FIG. 3.

Figure 4:
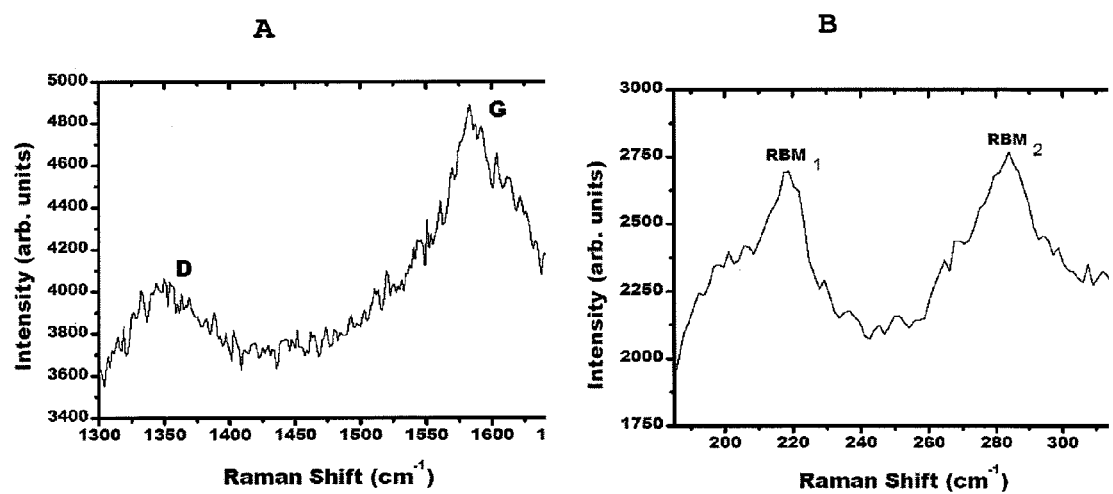
FIG. 4 shows diagrams of Raman Spectroscopy. The samples were produced by using an excitation energy of 1.96 eV.

The present invention was analytically assayed trough Raman spectroscopy. The photon involved in the Raman process is in resonance with an electronic state of the analyzed sample. The observation of the Raman spectra from only one nanotube is possible because of the very large density of electronic states close to the Van Hove singularities of this one dimensional structure. FIG. 4 shows resonance Raman spectra in the 100 to 1650 cm$^{-1}$ spectral range from SWCNT.

The amount and quality of the obtained nanotubes depend on several parameters, such as length of the graphite rods, voltage, frequency of the power supply, current flow intensity and inert gas pressure. Usually, the diameter is in the range of 0.9 to 1.2 nm for a SWCNT.

The following examples are illustrative representations of the invention and should not be considered as limitations or restrictions of the scope of the invention.

EXAMPLES

Example 1

As precursor materials, rods of pure graphite were used, which have diameters from 0.5 mm to 3.0 mm, wherein its length is not greater than 20 mm.

After the sublimation process, the graphite rod is transformed into a warm powder. These powders are carbon materials that are purified with acid and heating.

Example 2

The apparatus of FIG. 1 produces nanotubes during milliseconds, which is exactly the short circuit current moment.

The length of the obtained nanotubes is about 225 nm, at room pressure and atmosphere. The TEM image (FIG. 3) shows SWCNTs with an amount of disorder present in the graphitic walls. On the basis of the Young's modulus correlation, this disorder can be reduced with an increasing of pressure greater than 100 GPa.

Applicability

According to the present invention, carbon nanotubes can be produced by using a short circuit current method, without metal catalytic or other severe experimentations. Therefore, the present invention provides a method and a reactor, which results are obtained with a very low cost and higher yield and quality. Such improvements solve the problems of the state of the art and bring an important benefit for those skilled in the art, when applying the present invention in industries, laboratories and researches.

The invention claimed is:

1. A reactor for producing nanotubes and/or other allotropic forms of carbon, comprising:
   a glove box (6) having assembled therein a glass vessel with a bracket (7) and two metal electrodes (8), the electrodes (8) being plugged into an AC power supply,
   a tube (9) connected with the glove box (6), the tube (9) for carrying an inert gas, and
   a solid carbon precursor directly connected to the two electrodes (8).

2. The reactor according to claim 1, further comprising a multimeter (10) for indicating a voltage on the solid carbon precursor that is pulverized when is carried an intense electric current (short circuit electric current), thus producing said nanotubes and/or other allotropic forms of carbon.

3. The reactor according to claim 1, wherein the solid carbon precursor is a graphite rod.

4. A reactor for producing nanotubes and other allotropic forms of carbon, comprising:
   an electronic box (1) comprising electronic circuits, which are connected to an electric cable (2) plugged into an AC power supply,
   a glass reactor (5),
   an electric cable (3), which electrically connects the electronic box to a plug (4) of the glass reactor (5),
   two metal electrodes (8) within the glass reactor (5), and
   a solid carbon precursor directly connected to the two electrodes (8).

5. The reactor according to claim 4, further comprising a multimeter (10) for indicating a voltage on the solid carbon precursor that is pulverized when is carried an intense electric current (short circuit electric current), thus producing said nanotubes and/or other allotropic forms of carbon.

6. The reactor according to claim 4, wherein the solid carbon precursor is a graphite rod.

\* \* \* \* \*